July 1, 1958  R. J. PRICE  2,841,709
PRECISION VARIABLE-DELAY PULSE GENERATOR
Filed April 4, 1955  7 Sheets-Sheet 1

INVENTOR.
ROBERT J. PRICE
BY
*George E. Pearson*
ATTORNEYS

INVENTOR.
ROBERT J. PRICE

July 1, 1958 R. J. PRICE 2,841,709
PRECISION VARIABLE-DELAY PULSE GENERATOR
Filed April 4, 1955 7 Sheets-Sheet 4

| Fig. 6a | Fig. 6c |
| Fig. 6b | |

Fig. 5

INVENTOR.
ROBERT J. PRICE
BY
George E. Pearson
ATTORNEYS

Fig 6a

INVENTOR.
ROBERT J. PRICE
BY
George E. Pearson
ATTORNEYS

Fig 6b

July 1, 1958  R. J. PRICE  2,841,709
PRECISION VARIABLE-DELAY PULSE GENERATOR
Filed April 4, 1955  7 Sheets-Sheet 7

(a) OUTPUT--JACK 24
    NORMAL
    SCOPE
    TRIG--JACK 22

SCOPE TRIG TIME $t_o$
DELAYED OUTPUT PULSE 33

(b) OUTPUT--JACK 24
    DELAYED
    SCOPE
    TRIG--JACK 22

SCOPE TRIG TIME $(t_o + t_1)$
DELAYED OUTPUT PULSE 33

(c) PAIRED PULSE
    OUTPUT--JACK 26
    NORMAL
    SCOPE
    TRIG JACK--22

$t_o$ REFERENCE PULSE
DELAYED OUTPUT PULSE 33

(d) MIXED OUTPUT--JACK 30
    NORMAL
    SCOPE
    TRIG--JACK 22

SCOPE TRIG TIME $t_o$
VIDEO PULSE
DELAYED OUTPUT PULSE 33

(e) SYNT OUTPUT JACK 21
    INT TRIGGER
    NORMAL
    SCOPE $t_o$ REFERENCE PULSE
SCOPE TRIG TO $t_o$- 2 µSEC (f) MIXED OUTPUT--JACK 30
    DELAYED
    SCOPE
    TRIG--JACK 22

SCOPE TRIG TIME $(t_o + 2)$
VIDEO PULSE
DELAYED OUTPUT PULSE 33

*Fig. 8*

INVENTOR.
ROBERT J. PRICE
BY
George E. Pearson
ATTORNEYS

United States Patent Office 2,841,709
Patented July 1, 1958

2,841,709

PRECISION VARIABLE-DELAY PULSE GENERATOR

Robert J. Price, San Diego, Calif.

Application April 4, 1955, Serial No. 499,257

10 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

This invention relates generally to devices for measuring pulse time intervals or spacing and more particularly to a precision variable-delay pulse generator for reproducing pulse time intervals with a high degree of accuracy.

With the increasing complexity of electronic equipment employing pulse time spacing such, for example, as high speed computers, delay lines, and radar ranging and pulse coding equipments, there has been a growing need for a means to measure this spacing accurately. There has also been a growing problem of standardization in measurement of time intervals by two or more organizations working on the same project and the further problem of eliminating the incompatibility of like units of equipment resulting from non-uniformity in the time measurements employed by different organizations producing the respective units.

Devices heretofore employed for measuring these pulse time intervals through the use of a delayed pulse generator have generally used a form of delay multivibrator or a form of sinusoidal phase shifter which is calibrated in microseconds delay. These prior art devices have the disadvantage of requiring precision components and frequent calibration with resultant reduced accuracy, reliability and stability.

According to the arrangement and inventive concept of the precision pulse generator of the present invention, an accurate delayed pulse is selected from an accurately formed 1 $\mu$sec. pulse train having pulses 0.25 $\mu$sec. wide. This pulse train is generated from a 1–Mc. oscillator which is gated on with a time-zero, $t_0$, or reference pulse. The $t_0$ pulse is derived from a trigger or sync pulse supplied either internally or externally.

The phase of the oscillator output is shifted in an amount sufficient to compensate for the inherent delay introduced in both starting the oscillations and in generating the output pulse.

The desired delayed output pulse is selected from the 1 $\mu$sec. train by making coincidence with a wider, less accurately delayed pulse whose time delay is determined in accordance with the equation:

$$t = 100H + 10T + U - 0.4 \,\mu\text{sec.}$$

where:

$H$ = setting of Hundreds decade switch
$T$ = setting of Tens decade switch
$U$ = setting of Units decade switch
0.4 $\mu$sec. = time required to provide sufficient overlap with one selected pulse for reliable coincidence therewith and to cover the added delay introduced by the output circuitry.

The Hundreds switch incrementally delays a multivibrator which is triggered by the $t_0$ pulse. The recovery time of the multivibrator, however, is controlled by a train of pulses taken from a tap on a 100 $\mu$sec. delay line in order to keep the multivibrator accurate and to avoid the need for precision components.

The $t_0$ pulse also initiates the generation of a 100 $\mu$sec. pulse train through the aforementioned 100 $\mu$sec. delay line, this pulse train being synchronized for accuracy with a 10 $\mu$sec. pulse train. The $t_0$ pulse initiates generation of the 10 $\mu$sec. pulse train through a 10 $\mu$sec. delay line and this pulse train is synchronized for accuracy with the 1 $\mu$sec. delay line with the result that the pulses in the 10 $\mu$sec. train are accurate to within ±.15 $\mu$sec.

The Tens switch selects taps on the 100 $\mu$sec. delay line which respectively supply ten trains of 100 $\mu$sec.-spaced pulses with each train successively time-displaced by approximately 10 $\mu$sec. The pulses in these trains are about 8 $\mu$sec wide and need be accurate to only ±2 $\mu$sec. Similarly, the Units switch selects taps on the 10 $\mu$sec. delay line which respectively supply ten trains of pulses spaced 10 $\mu$sec. apart, each train being time displaced by 1.0 $\mu$sec. The pulses in these trains are about 1 $\mu$sec. wide and need be accurate to only ±.2 $\mu$sec.

The differentiated trailing edge of the multivibrator output is used to initiate a 100 $\mu$sec. gate which is applied together with the 10 $\mu$sec. train and the pulse train selected by the Tens switch to a triple coincidence circuit. Otherwise stated, the 100 $\mu$sec. gate selects 10 pulses from the 10 $\mu$sec. train and one of the pulses in the Tens switch output makes coincidence with and gates one of the ten pulses which thus appears in the output of the coincidence circuit and is used to initiate a 10 $\mu$sec. gate.

The 10 $\mu$sec. gate, the pulse train selected by the Units switch, and the 1 $\mu$sec. train are applied to a coincidence tube, the output of which is the desired pulse selected from the 1 $\mu$sec. train. Otherwise stated, the 10 $\mu$sec. gate selects the pulse having the aforementioned time value:

$$t = 100H + 10T + U - 0.4 \,\mu\text{sec.}$$

and this pulse, in turn, selects the accurate output pulse from the 1 $\mu$sec. train.

A Tenths decade switch selects taps on a high-fidelity delay line which respectively provide additional incremental delays of 0.1 $\mu$sec. which may be introduced into the pulse output circuit.

An object of the present invention is to provide new and improved means for measuring pulse time intervals or spacing.

Another object is to provide new and improved means for reproducing pulse time intervals of variable delay with a high degree of accuracy.

Another object is to provide new and improved means for generating an accurate pulse which is selectively variable in time delay over a wide range.

More specifically, an object of this invention is to provide a precision variable-delay pulse generator which produces a positive pulse variable in delay from 1.0 to 999.9 $\mu$sec. in increments of 0.1 $\mu$sec.

Another object is to provide an accuracy of delay of ±0.1 $\mu$sec over the entire range with a jitter of less than 0.01 $\mu$sec.

A further object is to provide a pulse generator as aforedescribed having provisions for internal or external synchronization and further provision for indication of the pulse repetition frequency (PRF) in either case.

Still another object is to provide an internal PRF generator having provision for trigger pulse generation over two ranges extending from 10 to 200 p. p. s. and 100 to 2000 p. p. s., respectively, and having further provision for supplying a 2 μsec. pre-knocked sync pulse for an oscilloscope.

Still another object is to provide a variable delayed scope trigger which is variable in 10 μsec. intervals and synchronized with a pulse train in the pulse generator to provide a "jitter-free" sweep sync at all delay settings up to 990 μsec.

Still another object is to make provision for mixing the delayed output pulse with positive-pulse video signals applied to the pulse generator and for supplying the mixed pulses for comparative display and time measurement on an oscilloscope.

Still another object resides in the provision of test signal means for selective presentation on an oscilloscope of either a regeneration of the video signals or paired pulses (reference pulse to and delayed output pulse), this selection being useful in making rapid pulse spacing comparisons.

An additional object is to provide a precision pulse generator having built-in provision for calibration of the time base oscillator and further provision for utilizing the PRF indicator to indicate the desired calibration.

Other objects and many of the attendant advantages of this invention will be readily appreciated as the same becomes better understood by reference to the following detailed description when considered in connection with the accompanying drawings wherein.

Figure 1:
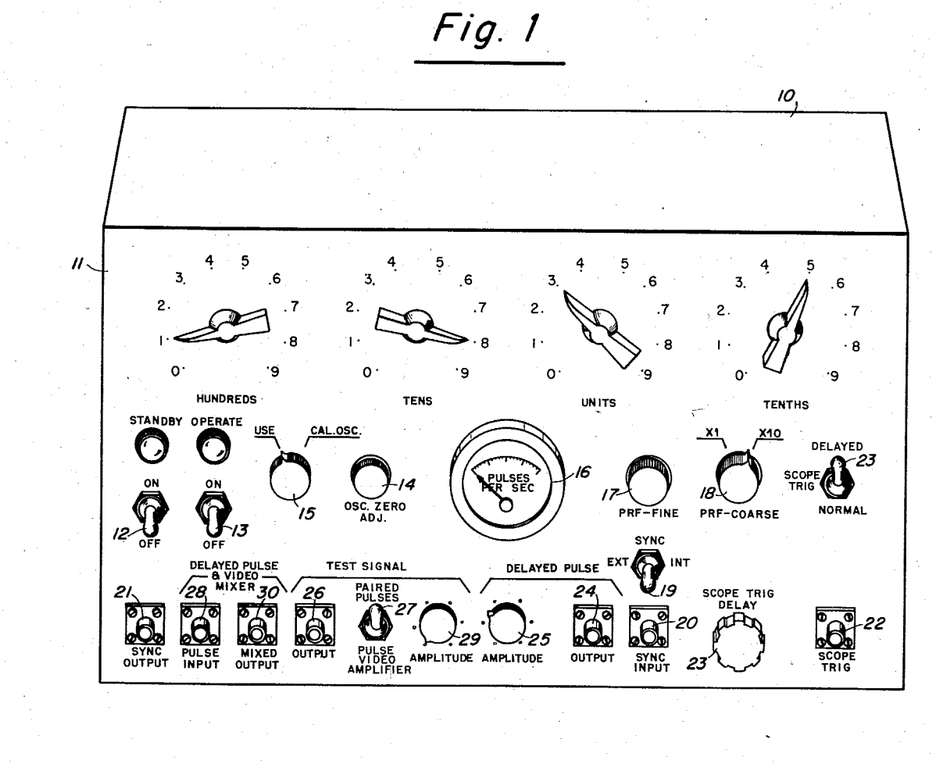
Fig. 1 is an oblique pictorial view presenting the outer appearance of the precision pulse generator of the present invention.

Referring now to the drawings for a more complete understanding of the invention, it may be seen from Fig. 1 that the pulse generator is housed in a container 10 of rectangular configuration having dimensions in the order of 18 x 12 x 16 inches. On the front panel 11 are presented the Hundreds, Tens, Units, and Tenths decade switches whose settings, taken all together, determine the time delay of the delayed output pulse in microseconds (μsec.).

Switches 12 and 13 control the Standby and Operate conditions of the pulse generator while the Osc. Zero Adj. knob 14 provides for frequency adjustment of the time base oscillator and knob 15 provides for transfer of the oscillator between conditions of normal circuit use (Use) and oscillation calibration (Cal Osc). Calibration of the time base oscillator is accomplished by comparing its frequency with that of the 1-Mc. crystal-controlled oscillator. These oscillators together with associated circuitry comprise a heterodyne calibrator, all of which is incorporated within enclosure 10. Zero beat is indicated on PRF meter 16 when knob 15 is in the Cal Osc position.

Knobs 17 and 18 respectively designate controls for making Fine and Coarse adjustments of the PRF generator which is also provided internally of the enclosure 10. Switch 19 provides for selection of operation of the pulse generator on either external (Ext) or internal (Int) sync pulses, the internal pulses being supplied by the PRF generator and the external sync pulses being applied by way of jack 20. In either case, the pulse repetition frequency is indicated on meter 16. A Sync Output jack 21 provides a positive pulse for synchronization of other equipment.

The PRF generator produces a 2 μsec. pre-knocked pulse and supplies this to the Scope Trig jack 22 when the Scope Trig switch 23 is in the Normal position thereof. When this switch is in the Delayed position, the scope trigger by adjustment of the Scope Trig Delay knob 23 may be varied in 10 μsec. intervals.

The delayed output pulse from the generator is supplied to the Output jack 24 and the amplitude of the pulse may be adjusted by knob 25. Paired pulses (reference pulse $t_0$ and the delayed output pulse) are supplied at the Output jack 26 when the Test Signal switch 27 is in the Paired Pulses position thereof. When switch 27 is in the Pulse Video Amp position, regeneration and amplification of positive video pulses applied to Pulse Video Input jack 28 are obtained and supplied to Output jack 26, amplification being controlled by knob 29. Mixed delayed and positive video pulses are supplied to the Mixed Output jack 30.

Figure 6A:
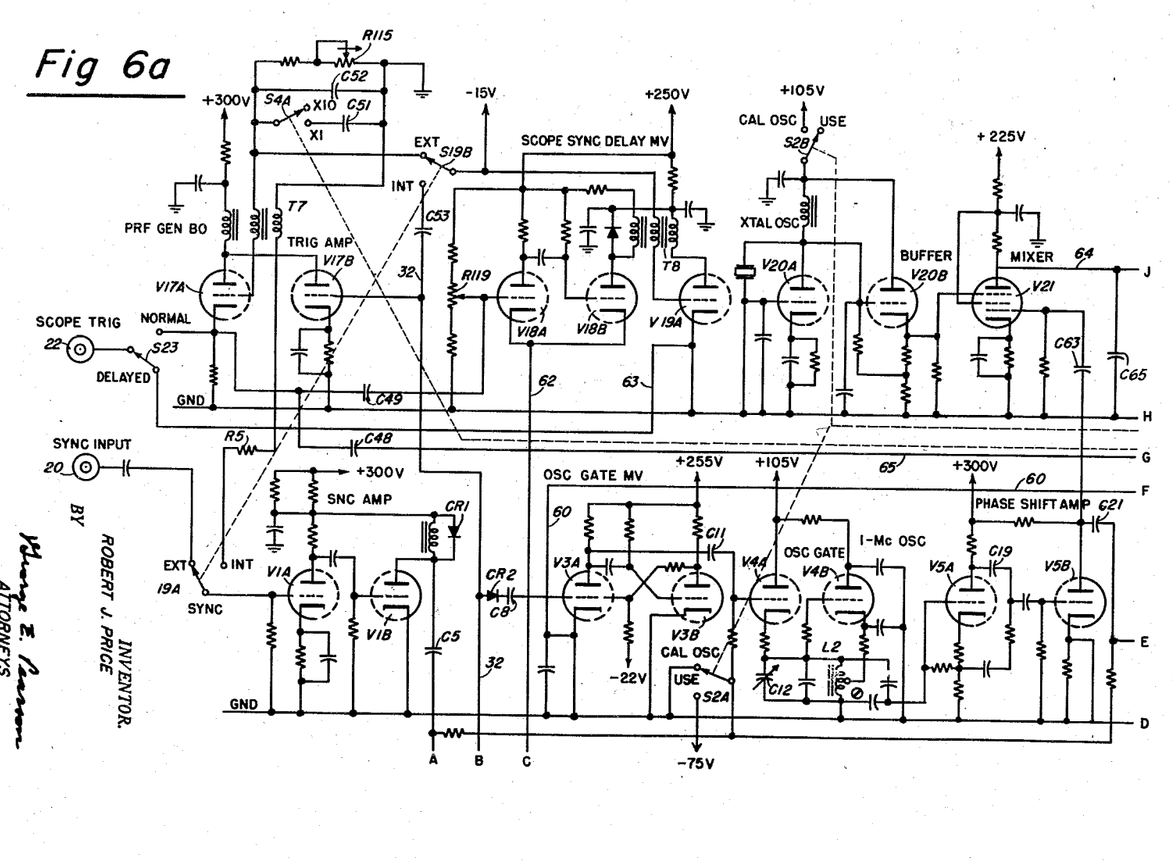
Figs. 6a, 6b, and 6c illustrate the electrical circuitry of the pulse generator in diagrammatic form.

A positive input sync pulse received from Sync Input 20 or from the PRF generator, depending on the position of switch 19, is applied to the Sync Amplifier comprising tubes V1A and V1B (Fig. 6a). This amplifier produces a fast positive trigger pulse, the amplitude and width of which are relatively independent of the input characteristics. This circuit is characterized by high trigger sensitivity and introduces negligible delay.

The plate output of tube V1B is applied via coupling condenser C5 to the grid of the Trigger Amplifier comprising tube V2A (Fig. 6b) whose transformer plate load is common with that of tube V2B which comprises the Sync Blocking Oscillator. The cathode load of V2B is divided to provide a time-zero pulse $t_0$ for distribution to various circuits of the pulse generator and additionally to provide a sync output pulse at jack 21.

The time-zero pulse $t_0$ is applied via conductor 32, crystal diode CR2, Fig. 6a, and condenser C8 to the grid of tube V3A which together with tube V3B comprise an Oscillator Gate Multivibrator. This circuit generates a negative gate at the plate of V3A which is applied via condenser C11 to the grid of tube V4A. This tube comprises the Oscillator Gate, current therefrom to inductance coil L2 being thus cut off by the negative gate and thereby starting 1-Mc. oscillations in tube V4B which is connected as a Hartley oscillator and continues oscillation as long as tube V4A is cut off. Condenser C12 is adjustable by knob 14 from the front panel to allow frequency adjustment of the oscillator, while adjustment of L2 permits coarse setting of the frequency.

The oscillator output is applied to the grid of tube V5A which together with tube V5B comprise a Phase Shifter-Amplifier circuit which provides adjustment in phase from approximately 0° to −90° with a relatively constant amplitude output. The correct phase adjustment is made by measuring, with auxiliary equipment, the exact delay between the trigger input and the delayed output when the unit is set for 10.0 μsec., and then setting condenser C19 to give a minimum error.

Figure 2:
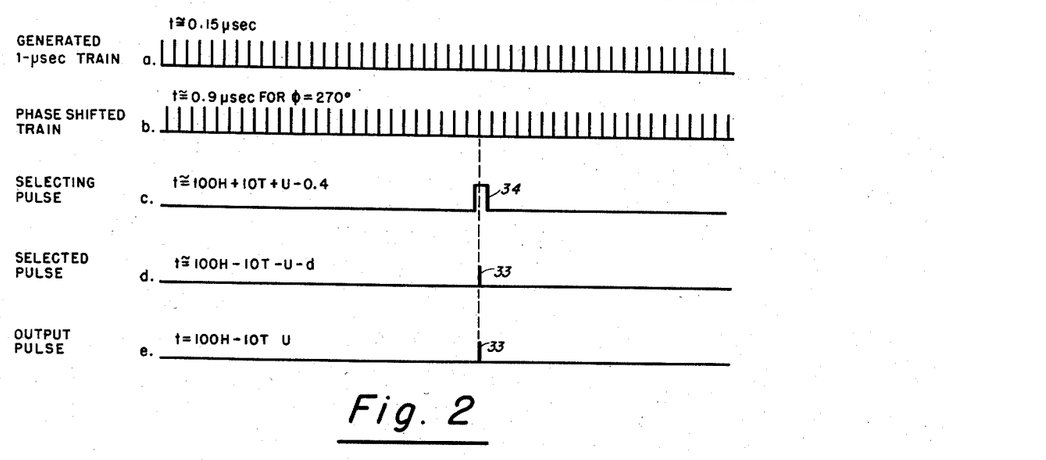
Fig. 2 is a diagrammatic view depicting the basic timing of the pulse generator.

The grid of amplifier V5B is self biased to near cut-off with the result that large negative half cycles are supplied by tube V5B via condenser C21 to Peaker tube V6A (Fig. 6c), thereby cutting it off rapidly. The output of V6A is a pulse train of 0.25 μsec.-wide pulses spaced 1.0 μsec. apart, and phased to be slightly less than an integral number of μsec. from the time-zero pulse $t_0$ as shown in Fig. 2b wherein a phase shift of 270° plus an inherent starting delay provides a time delay in starting the train of $t \cong 0.9$ μsec. The Cathode Follower comprising tube V6B, clips the over-shoot of plate load inductance L3 and provides a pulse train at a low impedance and with an amplitude of about 30 volts. It is necessary to shift the phase of the oscillator output to compensate for the inherent delay introduced in both starting the oscillations and in generating the delayed output pulse. Assuming for example, a delay of 0.15 μsec. in starting the train, the time values (t) of the pulses with reference to the time-zero pulse $t_0$ would be 0.15, 1.15, 2.15 . . .

μsec. (Fig. 2a). By retarding the phase (φ) by 270° (0.75 μsec.), the time values become 0.9, 1.9, 2.9 . . .

μsec. (Fig. 2b). After the desired pulse 33, Fig. 2d, is selected from this train, an additional delay of 0.1 μsec. in the output circuitry brings the values to 1.0, 2.0, 3.0 . . .

μsec., Fig. 2e.

After obtaining an accurate 1 μsec. pulse train, it is necessary to be able to select any single one of the pulses. The selection is made by obtaining a less accurately delayed pulse 34, Fig. 2c, and using it to make coincidence with or gate the desired pulse 33 from the 1 μsec. train. In order to make reliable coincidence, the less accurate pulse must occur slightly before the pulse to be selected, Fig. 2c.

Figure 5:
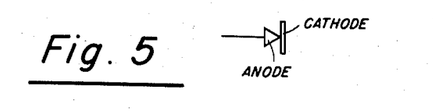
Fig. 5 is a diagrammatic view of a crystal diode identifying elements thereof.

If H equals the number of hundreds, T the number of tens, and U the number of units as set up on the selector switches, the actual time value of the pulse to be selected from the 1 μsec. train is:

$$100H + 10T + U - d \mu sec.$$

where $d$ is the added delay introduced by the output circuitry. The actual time value of the gating pulse should therefore be:

$$100H + 10T + U - d - 0.3 \mu sec.$$

in order to provide sufficient overlapping for reliable coincidence. Since $d$ will be about 0.1 μsec.:

$$100H + 10T + U - 0.4 \mu sec.$$

is adequate. The circuitry employed to obtain the gating pulse 34, as defined by the above equation will now be described, reference first being had to Fig. 5 which defines terms having to do with crystal diodes which are employed at strategic points throughout the circuitry. It will be noted that, considering an anode-cathode concept of the crystal diodes, the arrow designates the anode and the transverse line the cathode. Thus current, as distinguished from electrons which flow in the reverse direction, flows from anode to cathode or in the direction of the arrow from the arrow through the line.

Figure 6B:
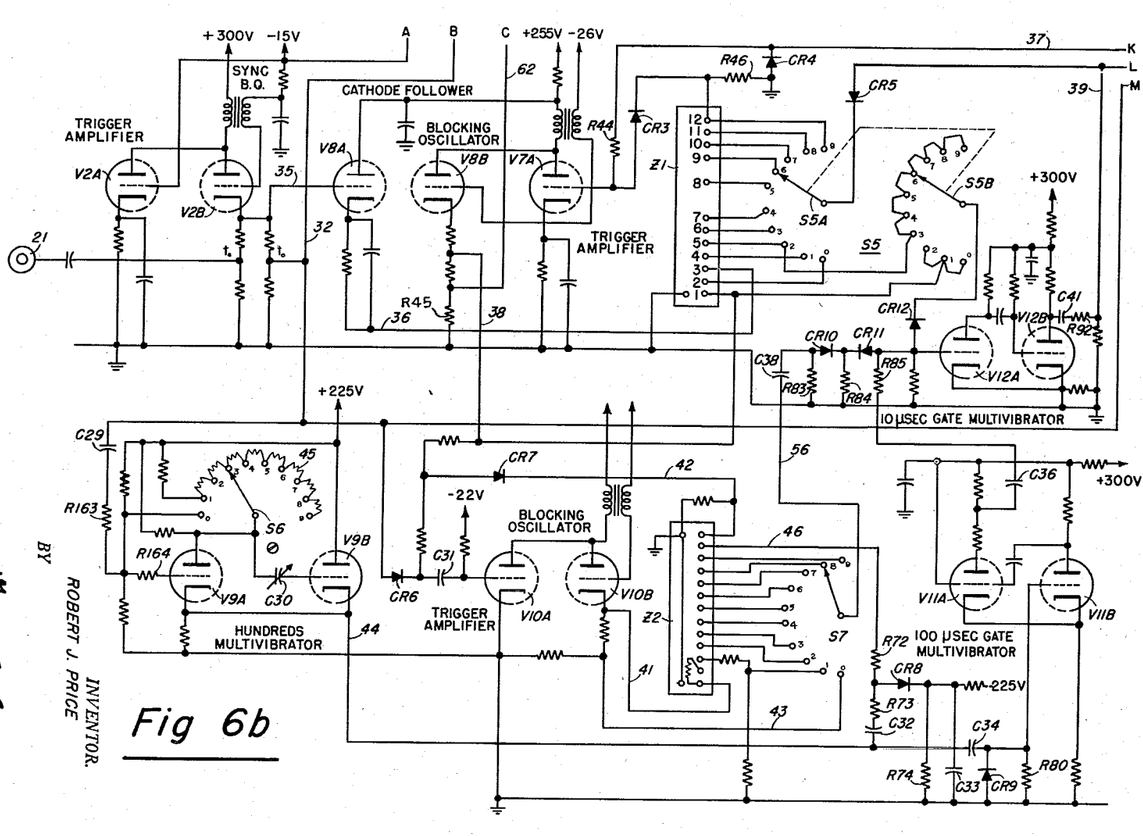

The $t_0$ pulse from tube V2B on conductor 35, Fig. 6b, is applied to the 10 μsec. delay line Z1 through the Cathode Follower comprising tube V8A. Z1 may be any type of lumped constant delay line Z17 supplied by the Brubaker Manufacturing Company of Los Angeles, California.

The $t_0$ pulse enters line Z1 via conductor 36 at tap 3 0.8 μsec. from the start of the line and arrives at the end of line Z1 at a time value of 8.8 μsec. and, hence, makes coincidence with the ninth pulse of the 1 μsec. pulse train. The positive pulses in the 1 μsec. train are supplied from tube V6B via condenser C24, Fig. 6c, and conductor 37 and are applied across resistance R44, Fig. 6b, crystal diode CR3, and resistance R46 connected in series to ground. CR3 and R46 offer a very low impedance to the pulses, causing most of the voltage to be dropped across R44. When a positive pulse arrives at the end of Z1 it back-biases CR3, which creates a high impedance to the 1 μsec. train, and allows a pulse to appear on the grid of tube V7A which comprises a Trigger Amplifier. V7A triggers tube V8B comprising a Blocking Oscillator, which starts a positive pulse down Z1 entering tap 1 thereof from conductor 38 which connects the cathode load circuit of V8B. This pulse arrives at the end of the line 9.6 μsec. later, and makes coincidence with a pulse in the 1 μsec. train. V8B is again triggered, and the process continues as long as the 1 μsec. train is present. Small errors in Z1 are corrected each time the pulse reaches the end of the line, as it is the pulse from the 1 μsec. train which actually re-triggers V8B. This results in a pulse train whose pulses are accurate to within ±.15 μsec. in time value.

Figure 3:
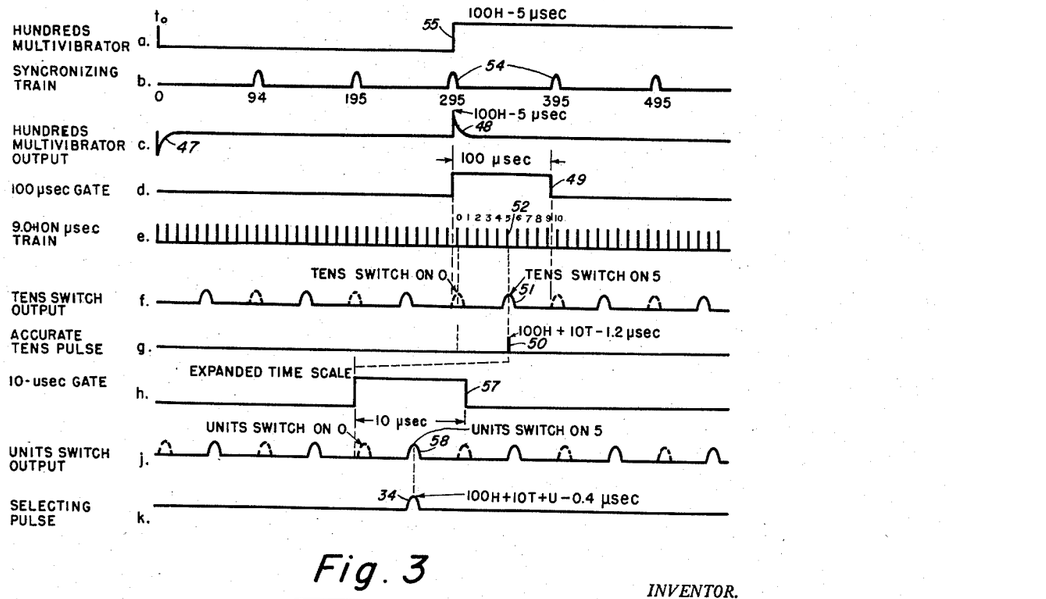
Fig. 3 is a diagrammatic view depicting the derivation of the gating or selecting pulse.
Figure 4:
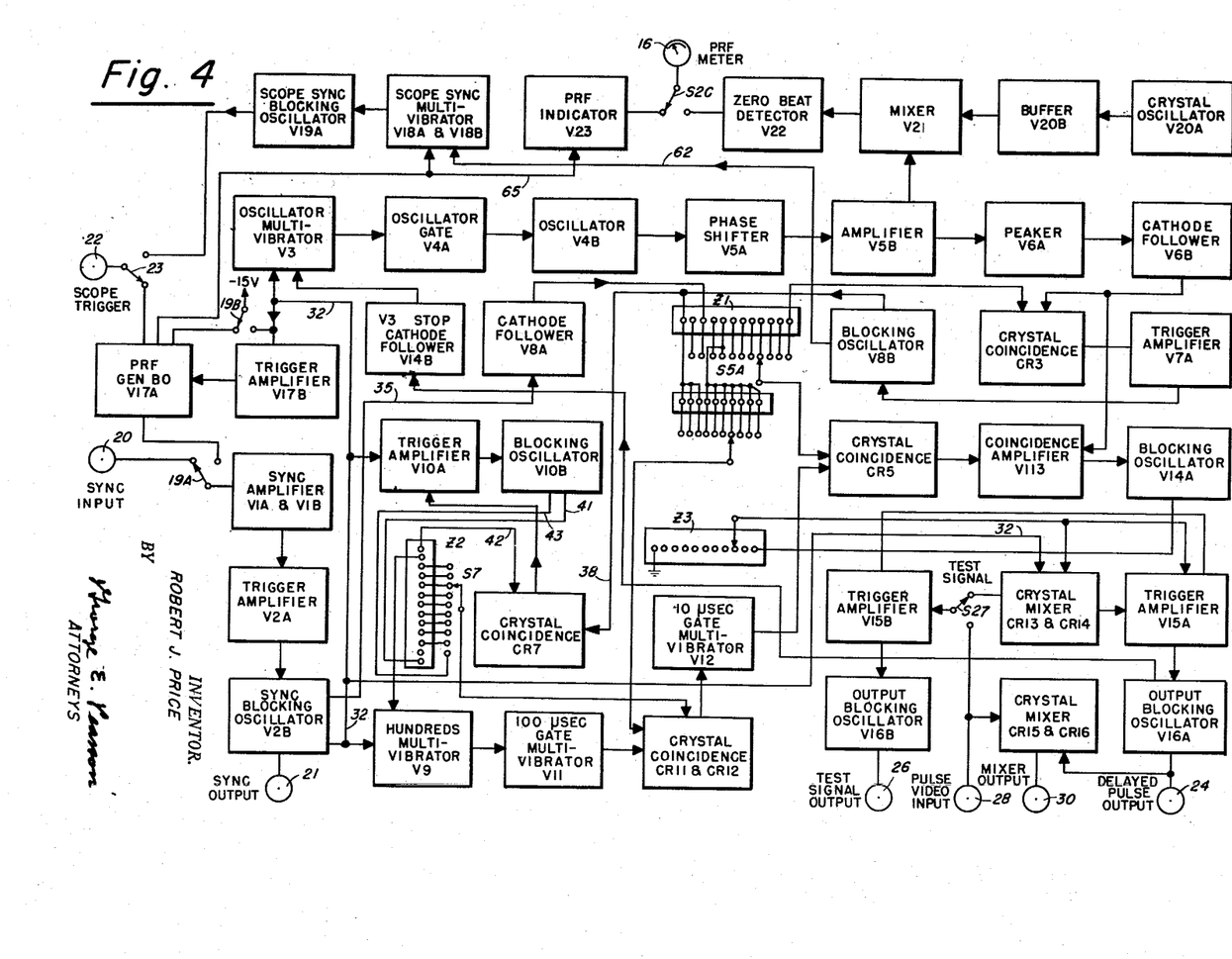
Fig. 4 is a block diagram of the complete electrical system of the pulse generator.

There is about 0.1 μsec. delay in triggering V8B, so the pulses entering Z1 occur at 9.0, 19.0, 29.0 . . . 1009.0 μsec.

or 9.0 + 10 N μsec. where N is any integer 0 to 99. This pulse train, designated at 52a, is similar to but slightly ahead of the train 52 of Fig. 2e. Tap 2 on Z1 provides the train 9.0 + 10 N delayed 0.6 μsec., namely, 0.2, 9.6, 19.6, 29.6 . . . 1009.6 μsec.

and this appears on contact 0 of bank A of Units selector switch S5. Tap 4 on Z1 provides the train 1.2, 10.6, 20.6 . . . 1010.6 μsec.

and this appears on contact 1 of bank A of switch S5. Similarly, tap 5 on Z1 provides the train:

2.2, 11.6, 21.6 . . . 1011 μsec.

and this appears on contact 2 of bank A of switch S5. Thus, the wiper of Unit switch S5 on bank A thereof selects one of ten trains of pulses spaced 10 μsec. apart and time-displaced from each other by 1 μsec. as determined by the delay line Z1 from which the trains are derived by synchronization with the 1 μsec. line. The pulses of these trains are about 1 μsec. wide and accurate to ±.2 μsec. These pulses are designated 58 in Fig. 3j. It will be understood that the values given for these trains are ideal and that, in actual practice, they may vary as much as +0.1 or −0.4 μsec. from the values stated, depending on the delay lines used.

Crystal diode CR4 provides a rapid discharge path for C24 in order to prevent the building up of a negative bias on V7A at high duty cycles.

Tap 1 of delay line Z1 is also connected to contacts 0, 1 and 2 on bank B of Units selector switch S5 and tap 5 on delay line Z1 is connected to contacts 3 through 9 on bank A of the selector switch. On the wiper for bank B of selector switch S5 there are thus provided two pulse trains, namely:

0.8, 9.0, 19.0, 29.0 . . . 1009.0 μsec.

and 2.2, 11.6, 21.6, 31.6 . . . 1011.6 μsec.

these trains being approximately 2 μsec. apart and appearing for the first three and last seven positions of switch S5 respectively. The first of these trains appears graphically in Fig. 3e and the pulse thereof are designated 52. Both trains are applied via the crystal diode CR12 to the input grid of the 10 μsec. Gate Multivibrator comprising tubes V12A and V12B, in order to initiate the 10 μsec. gate, Fig. 3h, as will appear more fully hereinafter.

The 10 μsec. gate appears on conductor 39 via condenser C41 and resistor R92 and is used to select a single pulse, Fig. 3j, from one of the ten trains of pulses appearing on the wiper for bank A of Units switch S5. Thus the Units switch selects the pulse train which contains pulses at U−0.4 μsec. When the train is gated by the 10 μsec. gate, a single pulse having a time value of $100H + 10T + U - 0.4$ μsec. is obtained. This is the required time value for a pulse to reliably gate the pulse occurring at $100H + 10T + U - 0.1$ μsec. from the accurate 1 μsec. pulse train. When the Units switch is on position 9, a pulse train having time values 8.8, 18.6, 28.6 . . . 1008.6 μsec.

is selected to be gated by the 10 μsec. gate. The gate would be initiated at $100H+10T-1.0$ μsec. or 119.0 μsec. Because of the width of the pulses in the train to be gated (about 1 μsec.), it is possible that the trailing portion of the pulse preceding the one at 128.6 μsec. (that is, 118.6 μsec.) would also be gated. To prevent this pulse from being gated, the initiation of the 10 μsec. gate is delayed 2 μsec. as by Units switch S5 is switched from position 2 to position 3. This, as has been seen in the foregoing, is accomplished by switching the pulse train 52 of Fig. 3e to one which is delayed 2 μsec.

The first pulse at time 0.8 in the train of Fig. 3e or 2.2 μsec. (in the case where the Units switch is in positions 3–9) is a product of the circuitry employed and is used only as a trigger for the 10 μsec. gate when both H and T are zero.

The $t_0$ pulse on conductor 32 is applied the crystal diode CR6, condenser C31, and the Trigger Amplifier and Blocking Oscillator comprising tubes V10A and V10B to the 100 μsec. delay line Z2 by way of conductor 41 and arrives at the end of the line at approximately 98 μsec. Coincidence of this output pulse on conductor 42 is obtained with the pulse occurring at 99 μsec. in the $9.0+10N$ ($N=9$) train 52a which appears, as it will be recalled, on conductor 38. Crystal diode CR7 offers a low impedance to the preceding pulses but becomes back biased by the $t_0$ pulse arriving at the end of the line. Thus, V10B is re-triggered by the pulse occurring at 99 μsec. and the cycle repeats as long as the $9.0+10N$ train is present on conductor 38.

Delay line Z2 may be of any type suitable for the purpose such, for example, as the M-derived lumped constant type 100 μsec. line D/L 403041, produced by the West Coast Electronics Company of Los Angeles, California.

Conductor 43 taps the cathode load of tube V10B and connects the zero contact of Tens switch S7 to provide on the wiper thereof a pulse train having the values of 0, 99, 199, 299 . . . 999 μsecs. Taps from delay line Z2 are brought out to the other contacts on the Tens switch S7 to thus provide in all a Tens Switch Output, Fig. 3f, on wiper of S7 comprising ten trains of 100 μsec.-spaced pulses with each train successively time-displaced by approximately 10 μsec. The second train appearing on the S7 wiper in contact with contact 1 of the switch, for example, provides the train 9, 108, 208 . . . 1008 μsec.

The $t_0$ pulse on conductor 32 is applied via condenser 29 and resistors R163 and R164 to the grid input of an incrementally delayed Hundreds Multivibrator comprising tubes V9A and V9B to trigger the same. The output of this multivibrator is the negative square wave 55, Fig. 3a, which appears on conductor 44 connecting the cathodes of tubes V9A and V9B. The width of the square wave output, Fig. 3a, is variable in 100 μsec. increments by adjustment of the Hundreds switch S6 whose wiper and contacts 1 to 9, interconnected by resistors 45 of suitable value for the purpose, constitute a step potentiometer. Contact 0 of the switch is connected to the grid input of tube V9A and thus, when the wiper of S6 is in the zero position of the switch, V9A and V9B are effectively placed in parallel with the result that a pulse appears on the cathode of the Hundreds Multivibrator at $t_0$.

The natural period of this multivibrator is adjusted by C30 to be slightly greater than 900 μsec. when switch S6 is in position 9. Pulses 54 which are taken from a tap on delay line Z2, namely, the pulse train 95, 195 . . . 995 μsec., Fig. 3b, appear on conductor 46 connected thereto and are applied via resistors R72 and R73, condenser C32, and conductor 44 to the cathodes of V9 and force the recovery of the multivibrator, thereby making it possible to maintain accuracy without using precision components. In order to keep the circuit stable under varying conditions of pulse repetition frequency (PRF) and line voltage, it is necessary to provide the pulses from delay line Z2 at a constant amplitude. This is accomplished through use of the crystal diode clipper CR8 in series with the parallel combination of resistor R74 and condenser C33.

The negative square wave 55 from the cathodes of V9, Fig. 3a, is differentiated by condenser C34 and resistor R80. The negative pulse 47, Fig. 3c, which appears at the leading edge of the negative square wave, is clipped by crystal diode CR9, the positive pulse 48, Fig. 3b, which occurs at the trailing edge of the negative square wave, being thus applied to the grid of V11B which together with V11A comprise a 100 μsec. Gate Multivibrator.

The positive pulse 48, Fig. 3c, occurs at $100H-5$ μsec. and triggers the 100 μsec. gate multivibrator, the output of which appears in the plate load circuit of the V11A and is a positive square gate 49, Fig. 3d, slightly greater than 100 μsec. wide. This gate is then applied via condenser C36 to a triple coincidence circuit comprising resistor R85, crystal diode CR11, resistor 84, crystal diode CR12, and the impedance of delay line Z1. When there are no positive pulses on the cathodes of CR11 and CR12, very little of the 100 μsec. gate voltage will appear at the grid of tube V12A comprising the 10 μsec. gate because of the low impedance offered by the crystals. The same is true if only one of the crystals has a positive pulse on its cathode. However, when both crystals have positive pulses on their cathodes at the same time, they are effectively back-biased, but if the 100 μsec. gate is present, the desired Accurate Tens Pulse from delay line Z1, namely, the voltage pulse 50, Fig. 3g, will be in effect applied to the grid of tube V12A to thereby trigger the 10 μsec. Gate Multivibrator comprising tubes V12A and V12B. It will be noted from Fig. 3 (d, e, f and g) that coincidence of the pulses 49, 52, and 51 yield the accurate 10 μsec. gating pulse 50 which has the value $100H+10T-1.2$ μsec. Fig. 3 (e and f) illustrate graphically how the particular one of the ten pulses selected by the 100 μsec. gate 49 is selected by setting of the Tens switch S7, the dashed line pulses, Fig. 3f, indicating the pulse train for position zero of the switch.

The network of condenser C38, resistor R83, crystal diode CR10, and resistor R84 effectively clips the Tens Switch Output pulses, Fig. 3f, received from delay line Z2 via the wiper of switch S7 and conductor 56 so that only the upper 80 percent appear on the cathode of crystal diode CR11. This prevents low amplitude delay line reflections and the wide bases of the pulses from giving pulse coincidence.

The 10 μsec. gate 57, Fig. 3h, appearing on the output of tube V12B on conductor 39 functions similarly to the 100 μsec. gate. Crystal diode CR5 offers a low impedance to the 10 μsec. gate except when there is a positive pulse on its cathode. The Units Switch Output pulse 58, Fig. 3j, which occurs during the 10 μsec. gate will, therefore, be selected and applied by way of condenser C42, Fig. 6c, to the number 1 grid of Coincidence Amplifier tube V13. Fig. 3 (h and j) illustrates graphically how the particular pulse selected by the 10 μsec. gate 57 is selected by the setting of the Units switch S5, the dashed line pulses, Fig. 3j, indicating the pulse train for position zero of the switch.

As indicated in Fig. 3, the Hundreds switch is in its number 3 position, it being noted that synchronizing pulse 54, Fig. 3b, has the value 295 at the differentiated trailing portion 48, Fig. 3c, of the Hundreds Multivibrator negative square wave output 55. It will be noted further that the Units and Tens switches are in their number 5 positions. Thus, the Selecting Pulse 34, Fig. 3k and Fig. 2c, has the value 355 as expressed by the equation $$100H+10T+U-0.4 \text{ μsec.}$$

Tube V13 is normally cut off with the bias voltages applied to the first and third grids. When a Units pulse is applied to the first grid, there will be an accurate pulse 33 from the 1 μsec. train applied via resistor 95 and condenser C25 to the third grid. The resulting coincidence pulse on the plate of tube V13 triggers the Blocking Oscillator comprising tube V14A. Resistor R99 and condenser C44 slow down the recovery of V14A in order to prevent the generation of more than one pulse.

The output of V14A is sent down the high-fidelity delay line Z3 which adds incremental delays of 0.1 μsec. as selected by the Tenths switch S8. Delay line Z3 may be of any type such, for example, as the M-derived lump constant line, DL44, supplied by the Brubaker Manufacturing Company of Los Angeles, California.

Figure 8:
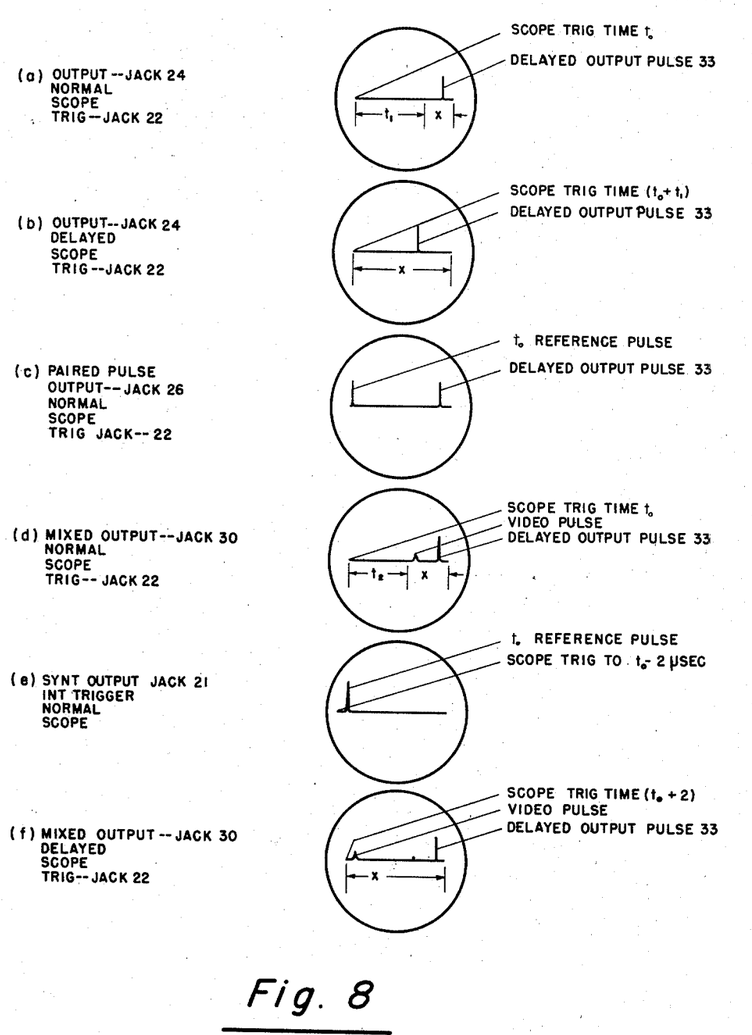
Fig. 8 is a diagrammatic view illustrating scope displays of the various pulse outputs obtained from the pulse generator of the present invention.

The selected pulse from the wiper of switch S8 is applied via conductor 59 to the Trigger Amplifier comprising tube V15A which, in turn, triggers the Output Blocking Oscillator comprising tube V16A. This provides a single delayed positive output pulse at the output jack 24, this being adjustable in amplitude by the potentiometer R106 whose wiper is connected to knob 25. This pulse appears on an oscilloscope as in Fig. 8a, when the oscilloscope is triggered by a pulse from jack 22, Figs. 1 and 6a, with the Scope Trig switch in the Normal position.

To recapitulate the basic functions of the circuitry thus far described are reviewed in the following. The $t_0$ pulse from a reference source (the external or internal synchronizing means) initiates the generation of the three pulse trains of which the pulses are spaced apart, respectively, by time intervals of first order (one microsecond), second order (ten microseconds) and third order (one hundred microseconds). The $t_0$ pulse also initiates generation of the third order delay gate 49. The second order train 58 is provided with a selective incremental delay of first order (one microsecond increments) by the setting of units switch S5 while the third order train is provided with a selective incremental delay of the second order (ten microsecond increments) by the setting of the tens switch S7, third order delay 49 being selected by switch S6. Each train above the first order is derived from and synchronized with the train of the next lower order. Thus the second order train is synchronized from the accurate one microsecond train, the third order train is synchronized by train 52a from the second order train, and the third order delay generator (producing but one pulse of a fourth order train) is synchronized by train 54. The second and third order delays are combined to select one third order pulse 50 having the selected second and third order delay (100H+10T) which produces a properly timed gate 57 for selection of one pulse 34 from the second order train 58 having the chosen first order delay. Pulse 34 selects one pulse of the accurate one microsecond train which is supplied as the output of the apparatus and is utilized to stop all trains after a further fractional delay. Pulse train 52 from the second order train is utilized to add a preselected delay to the gate 57 when a first order delay of three or more increments is selected in order to avoid selection of more than one pulse of the second order train.

The output pulse is fed through resistor R100 to the grid of tube V14B which comprises the V3 Stop Cathode Follower whose output is applied via resistor R101 in parallel with condenser 45 and conductor 60 to the cathode of tube V3A, Fig. 6a, comprising the Oscillator Gate Multivibrator. This pulse resets the multivibrator which, in turn, stops the 1-Mc. Oscillator and, subsequently, all other pulse trains heretofore described and generated following the $t_0$ pulse, thereby preventing other pulses (which otherwise would be caused by inaccuracies in the widths of the 10 and 100 μsec. gates) from appearing in the output.

Figures 6C, 7:
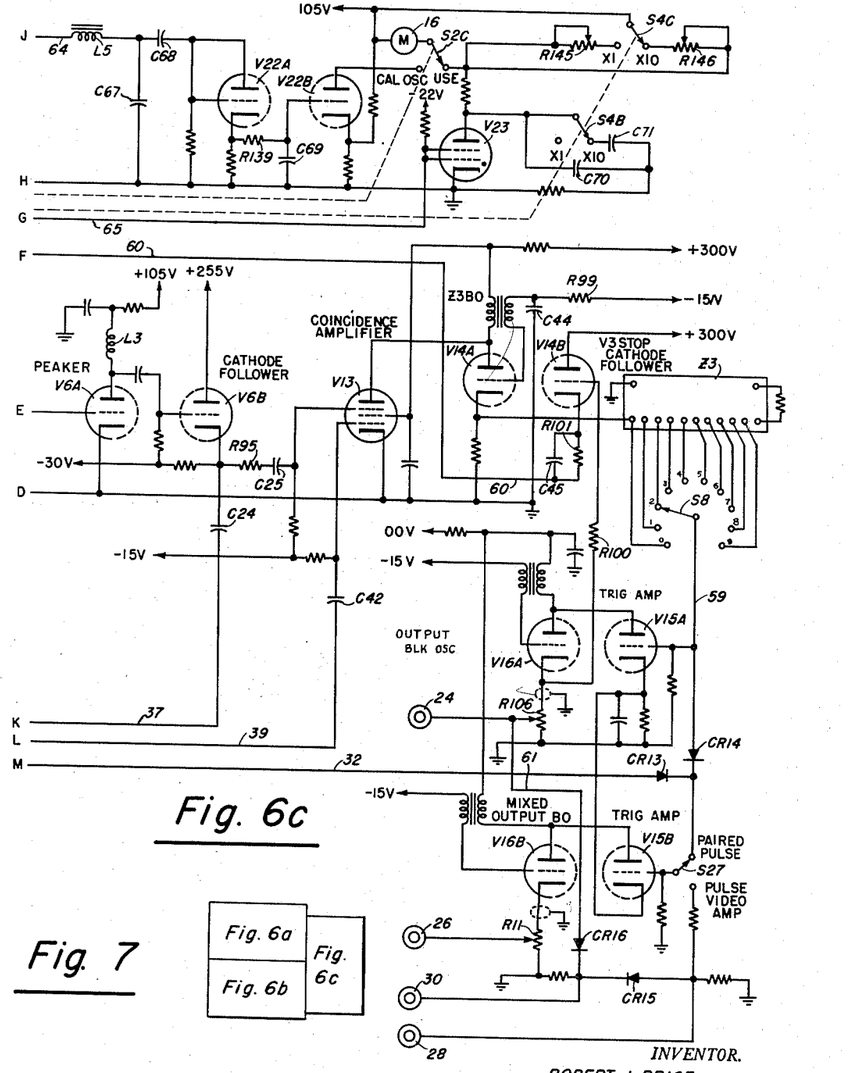
Fig. 7 is a diagram showing how Figs. 6a, 6b, and 6c may be placed to provide a complete circuit diagram.

The pulse from the wiper of S8, Fig. 6c, is mixed with the $t_0$ pulse on conductor 32 by operation of the crystal diodes CR13 and CR14. These pulses are applied to the Trigger Amplifier comprising tube V15B when the Test Signal switch 27 is in the Paired Pulse position thereof. Tube V15B triggers the Mixed Output Blocking Oscillator comprising tube V16B. The mixed output appears on the cathode of V16B and may be adjusted in amplitude by the potentiometer R11 whose wiper is connected to the knob 29, the mixed output appearing at jack 26 and on an oscilloscope as depicted in Fig. 8c.

When switch 27 is in the Pulse Video Amp position thereof, positive video pulses received on jack 28 are regenerated by V16B and appear at jack 26.

Video pulses received at jack 28 may be combined by means of crystal diode CR15, directly with the delayed output pulse received by way of conductor 61 and crystal diode CR16, the combined pulse appearing at jack 30 and appearing on an oscilloscope as depicted in Fig. 8d. To measure the time delay of the video pulse it merely is necessary to adjust the decade switches until the delayed output pulse 33 coincides with the video pulse and then reading the time delay as indicated by decade switches.

The internal PRF generator is a free-running blocking oscillator comprising tubes V17A, the frequency of which is controlled by the RC time constant in the grid circuit of the tube. Potentiometer R115 has its wiper connected to knob 17, Fig. 1, and provides a fine adjustment of the time constant and hence the PRF. Knob 18 controls switch S4 and thus connects condenser C51 into the RC circuit for the X1 position of the switch, condenser C52 alone controlling the RC time in the X10 position of the switch.

The positive pulse on the cathode of tube V17A is used as an oscilloscope trigger and is connected to the contact of the Scope Trigger switch S23 corresponding to the Normal position thereof. The trigger pulse $t_0$ for the delay generator is delayed about 2 μsec. from the scope trigger by using the overshoot from the tertiary winding of transformer T7, this winding being connected by resistor R5 to the contact corresponding to the Int position of Sync switch 19. This provides the scope trigger with a 2 μsec. pre-knock, making it possible to observe the $t_0$ zero pulse. Fig. 8e depicts the oscilloscope showing of the $t_0$ pulse as obtained from the Sync Output jack 21 when the oscilloscope sweep is triggered by the pre-knocked trigger pulse supplied to the contact corresponding to the Int position of Sync switch 19, as aforedescribed.

When using external synchronization, the grid of V17A is returned to −15 volts by way of pole B of switch 19 and the blocking oscillator circuit is triggered by reason of the $t_0$ pulse on conductor 32 being applied to the grid of the Trigger Amplifier comprising tube V17B. When using internal synchronization, the grid of V17B is returned to −15 volts via condenser C53 and switch 19 in the Int position thereof.

The scope trigger pulse from the cathode of tube V17A is also used to trigger the scope of Sync Delay Multivibrator comprising tubes V18A and V18B, this pulse being applied via condenser C49 to the grid of tube V18A. This circuit differs slightly from the ordinary cathode-coupled type. The cathodes of V18 are returned to ground through conductor 62 and R45 which is in the cathode circuit of tube V8b comprising the Z1 Blocking Oscillator. This places a low amplitude train of pulses spaced 10 μsec. apart on the cathode of tube V18, causing the multivibrator to jump in 10 μsec. increments as R119 is varied by adjustment of knob 23. This action keeps the recovery of the multivibrator stable and prevents jitter which otherwise would be present.

The plate circuit of tube V18B contains one winding of the delayed sync blocking oscillator transformer T8. This winding is so polarized as to trigger the Sync Blocking Oscillator comprising tube V19A when tube V18B starts to conduct. The positive pulse appearing at the cathode of tube V19A, therefore, occurs at a delay determined by the setting of potentiometer R119. This pulse is applied via conductor 63 corresponding to the Delayed position thereof and appears on the Scope Trig jack 22 when switch 23 is in this position.

Fig. 8b shows the delayed output pulse of Fig. 8a as it appears when the scope trigger is delayed by time $t_1$. Similarly, Fig. 8f shows the pulses of Fig. 8d as they appear when the scope trigger is delayed by time $t_2$.

Calibration of the gated Oscillator, V4B, Fig. 6a, is obtained by zero-beating the gated oscillator against a crystal controlled oscillator, XTAL Oscillator comprising tube V20A. During calibration the grid of V4A, Oscillator Gate, is returned to −75 volts by adjustment of knob 25 to its Cal Osc position which adjusts switch S2 such that pole A of the switch, connected to the grid, engages the switch contact connected to the −75 volt supply. This allows the oscillator V4B to operate continuously.

The frequency of the gated oscillator is sampled from the plate of tube V5B, Phase Shifter-Amplifier, and applied via condenser C63 to the grid of tube V21 which comprises the Mixer circuit. The crystal oscillator V20A is coupled through the cathode follower Buffer comprising tube V20B to another grid of the mixer tube V21, pole B of switch S2 being in the Cal Osc position of the switch. The difference frequency is applied via conductor 64, filter inductance L5, Fig. 6c, and condenser C68 to the PRF Indicator comprising tubes V22A and V22B and meter 16, the condenser being connected to both the grid and plate of tube V22A which thus serves as a diode detector. The difference frequency is selected to have a value such that the voltage coupled to tube V22A is caused to fall off rapidly as the frequency is decreased.

The 1 Mc. component from the mixer is filtered out by inductance L5, condensers C65 and C67. The audio difference frequency is rectified by tube V22A and applied via resistor R139 and condenser C69 as bias to tube V22B, pole C of switch S2 being in the Cal Osc position of the switch. There is, therefore, a change of current in tube 22A which is a function of the difference frequency and which is displayed on the PRF meter 16 when switch S2 is in the Cal Osc position thereof. This circuit is very sensitive to small changes in frequency, giving almost a full deflection for a difference frequency of 100 c. p. s.

When switch S2 is in the Use position, meter 16 is placed in the plate circuit of thyratron tube V23. Trigger pulses received from the cathode of V17A via condenser C48, Fig. 6a, and conductor 65 are applied to the grids of tube V23 in sufficient amplitude to overcome the −22 volt bias thereon whereby the thyratron is fired, thereby discharging condenser C70. The average current necessary to charge this condenser between pulses and through meter 16 in parallel with potentiometer R145 or potentiometer R146, depending on the position of switch S4 is very nearly a linear function of pulse frequency, which makes possible a linear calibration of pulses per second on meter 16. The value of condenser C70 is increased by the additional capacitance of condenser C71 for a multiplication of 10 when pole B and C of the PRF–Coarse adjust switch S4 are in the X10 position of the switch. The PRF indicator may be calibrated for both PRF ranges (X1 and X10) by the internal adjustment of potentiometers R145 and R146 respectively.

It will be recalled that the $t_0$ reference pulse appears on conductor 32 and triggers tubes V17B and V17A when Sync switch 19 is in the Ext position. Thus, a pulse is received from V17A and applied to thyratron V23 to obtain a PRF indication in the case of external triggering of the time delay lay generator as well as in the case of internal triggering thereof.

It will be understood that the power supply, not shown, may be of any type suitable for the purpose and is contained in the enclosure 10. It will be further understood that where tubes have been designated by letters such, for example, as V14A and V14B, these may be combined in a single envelope.

Obviously many modifications and variations of the present invention are possible in the light of the above teachings. It is therefore to be understood that within the scope of the appended claims the invention may be practiced otherwise than as specifically described.

What is claimed is:

1. A delayed pulse generator comprising a free running adjustable blocking oscillator for providing a sync pulse at a predetermined pulse repetition frequency and having a transformer plate load including a tertiary winding for providing a pre-knocked scope trigger, means responsive to said sync pulse for generating a time zero reference pulse, means responsive to said reference pulse for initiating generation of an accurate pulse train, means responsive to said reference pulse and synchronized with said pulse train for gating a predetermined pulse therefrom, and means responsive to said sync pulse and synchronized with said gating means for providing a delayed scope trigger adjustable in increments of delay and free of jitter.

2. A delayed pulse generator as in claim 1 having means settable at will for initiating operation of said reference pulse generating means by a sync pulse received from said oscillator or selectively by an external sync pulse, means for triggering operation of said oscillator in response to said reference pulse when the same is initiated by said external sync pulse, and circuit means for indicating the pulse repetition frequency of the sync pulse output of said oscillator.

3. A delayed pulse generator as in claim 1 having a scope trigger output and means selectively settable at will for presenting said pre-knocked scope trigger pulse or said delayed trigger pulse to said scope trigger output.

4. A delayed pulse generator comprising means for generating a time zero reference pulse, means responsive to said reference pulse for initiating generation of an accurate 1 μsec. pulse train, means responsive to said reference pulse and including a tapped 10 μsec. delay line for generating a plurality of pulse trains time-displaced from each other by approximately 1 μsec. in accordance with the taps on said line and each train having pulses spaced by 10 μsec, means for synchronizing said last named pulses with the 1 μsec. train, means responsive to said reference pulse and including a tapped 100 μsec. delay line for generating a plurality of pulse trains time-displaced from each other by approximately 10 μsecs. in accordance with the taps on the 100 μsec. line and each train having pulses spaced by 10 μsecs., means for synchronizing said last named pulse trains with one of the pulse trains derived from said 10 μsec. line, means responsive to said reference pulse and delayable selectively in 100 μsec. increments for gating 10 pulses from said one of the pulse trains, means for selecting a predetermined one of the pulse trains derived from said 100 μsec. line, means responsive to said last named pulse train and one of said ten pulses in coincidence therewith for gating said one of the pulses, means for selecting a predetermined one of the pulse trains derived from said 10 μsec. line, means responsive to said one of the pulses for gating ten pulses from said 1 μsec. train, and means responsive to said train selected from the 10 μsec. line and one of said ten pulses from the 1 μsec. line in coincidence therewith for gating said last named one of the pulses.

5. A pulse generator comprising means for generating a time zero reference pulse, means responsive to said pulse for initiating generation of an accurate 1 μsec. train of pulses, a 10 μsec. delay line having a plurality of taps, means responsive to said reference pulse and including said delay line for generating a plurality of pulse trains time-displaced from each other by 1 μsec. and each having pulses spaced by 10 μsec., means for synchronizing said last named pulses with said 1 μsec. train, a 100 μsec. delay line having a plurality of taps, means responsive to said reference pulse and including said 100 μsec. delay line for generating a plurality of pulse trains time-displaced from each other by 10 μsecs. and each having pulses spaced by 100 μsecs., means for synchronizing said last named pulse trains with one of said 10 μsec. pulse trains derived from said 10 μsec. line, a multivibrator responsive to said reference pulse and having means adjustable at will for incrementally delaying the square wave signal output therefrom in 100 μsec. steps, means for synchronizing said multivibrator output with one of said pulse trains derived from said 100 μsec. line, means for differentiating said square wave signal output, means responsive to the differentiated tail portion of said square wave for generating a 100 μsec. gate, a triple coincidence circuit having said 100 μsec. gate applied thereto, means for selecting and applying the pulses from said 100 μsec. delay line to said triple coincidence circuit, means for applying said one of said 10 μsec. pulse trains to said coincidence circuit whereby the 100 μsec. gate selects 10 pulses therefrom and the pulse from said selected one of the 100 μsec. pulse trains selected by the 100 μsec. gate selects a particular one of said 10 selected pulses which thereby appears in the output of the triple coincidence circuit, means responsive to the output of said triple coincidence circuit for generating a 10 μsec. gate, a multiple grid coincidence tube having said 10 μsec. gate applied to one of the grids thereof and the pulses from said 1 μsec. train applied to another of the grids thereof, means for selecting and applying one of the pulse trains derived from said 10 μsec. line to said first named grid whereby a desired delayed output pulse from said 1 μsec. pulse train appears in the output of said coincidence tube.

6. A delayed pulse generator comprising means for generating a time zero reference pulse, means operable in response to said time zero pulse for generating an accurate 1 microsecond train of pulses, a Units decade switch, means operable in response to said reference pulse and including a 10 microsecond delay line operatively connected to said Units decade switch for generating ten 10 microsecond pulse trains time-displaced from each other by 1 microsecond in accordance with the setting of said Units switch, a coincidence circuit responsive to the first pulse reaching the end of said 10 microsecond line and a predetermined pulse from said one microsecond train for synchronizing the first pulse train received from the 10 microsecond line with the 1 microsecond line, means including a Hundreds decade switch and operable in response to said reference pulse for generating a 100 microsecond gate time-delayed from said reference pulse in increments of one hundred microseconds in accordance with the setting of said Hundreds switch, a Tens decade switch, means operable in response to said reference pulse and including a 100 microsecond delay line operatively connected to said Tens switch for generating ten 100 microsecond pulse trains time-displaced from each other by ten microseconds in accordance with the setting of the Tens switch, a coincidence circuit responsive to said 100 microsecond gate, said first pulse train from the 10 microsecond delay line, and a pulse train selected by said Tens switch for selecting a pulse from said first 10 microsecond pulse train, means responsive to said selected pulse for generating a 10 microsecond gate, a coincidence circuit responsive to said 10 microsecond gate, a pulse train selected by said Units switch, and said 1 microsecond pulse train for selecting a pulse from the 1 microsecond train having a time delay relative to the reference pulse of value indicated collectively by said decade switches, a one tenth microsecond delay line, and means including a Tenths decade switch operatively connected to said one tenth microsecond delay line for passing said last named pulse therethrough to add one tenth microsecond delay increments to the time delay of said pulse in accordance with the setting of said Tenths switch.

7. A device of the class described comprising means for generating a reference pulse, means responsive to said pulse for generating a first train of pulses of first order spacing, frequency divider means responsive to said train for generating a second train of pulses spaced apart a second order of multiples of said first order spacing, means for deriving a second order synchronizing pulse train from said divider means, means responsive to said synchronizing train for producing a third train of pulses spaced apart a third order of multiples of said first order spacing, means responsive to said second and third trains for selecting a pulse of said first train, and means for selectively and independently delaying said second and third train in time increments of first and second order respectively.

8. A delay generator comprising means for generating a first train of pulses of precise first order spacing, means for generating second and third trains of pulses of second and third order spacing respectively, means for selectively and independently delaying said second and third trains by first and second order increments respectively, and means responsive to both of said second and third trains for selecting one pulse of said first train.

9. The structure of claim 8 including means for electronically synchronizing said second and third trains from said first train, and means responsive to said selected one pulse for stopping all of said trains.

10. The structure of claim 9 including means for adding a preselected delay to said one pulse selecting means when a first order delay in excess of a preselected magnitude is selected.

References Cited in the file of this patent
UNITED STATES PATENTS

| | | |
|---|---|---|
| 2,414,477 | Meacham | Jan. 21, 1947 |
| 2,422,204 | Meacham | June 17, 1947 |
| 2,466,044 | Schoenfeld | Apr. 5, 1949 |
| 2,471,408 | Busignies | May 31, 1949 |
| 2,516,888 | Levy | Aug. 1, 1950 |
| 2,662,977 | De Rosa | Dec. 15, 1953 |